July 30, 1963 W. L. COOK 3,099,057
SELF-RETAINING FASTENERS
Filed July 24, 1961 2 Sheets-Sheet 1

INVENTOR.
WALTER L. COOK
BY
Reynolds & Christensen
ATTORNEYS

July 30, 1963 W. L. COOK 3,099,057
SELF-RETAINING FASTENERS
Filed July 24, 1961 2 Sheets-Sheet 2
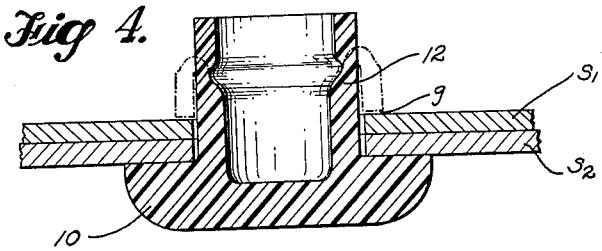
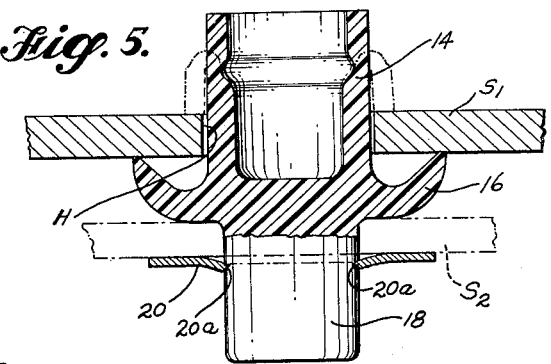
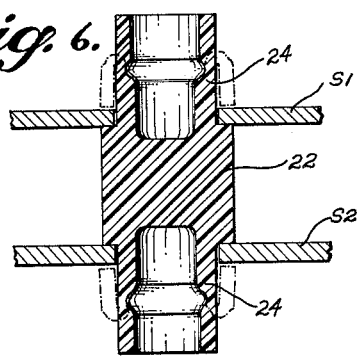
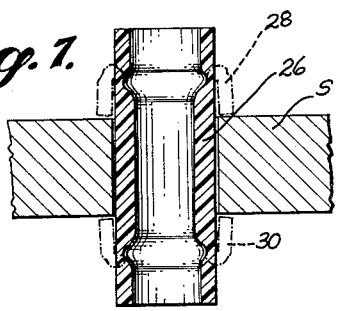
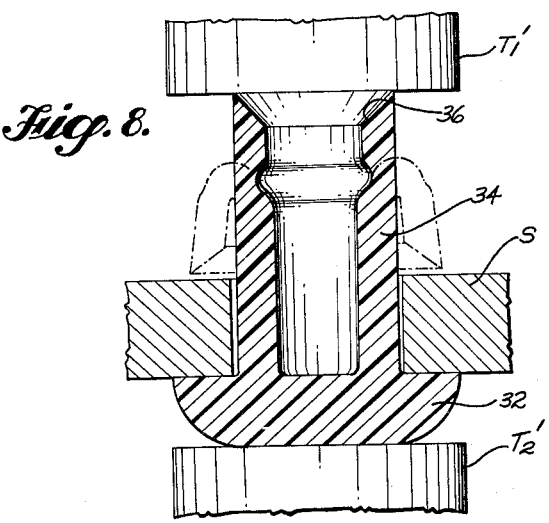
INVENTOR.
WALTER L. COOK
BY
Reynolds & Christensen
ATTORNEYS United States Patent Office 3,099,057
Patented July 30, 1963

3,099,057
SELF-RETAINING FASTENERS
Walter L. Cook, Seattle, Wash., assignor to The Boeing Company, Seattle, Wash., a corporation of Delaware
Filed July 24, 1961, Ser. No. 126,112
15 Claims. (Cl. 24—141)

This invention relates to self-retaining fasteners comprising thermoplastic and similar materials. The improved fasteners have a variety of forms and useful applications selected ones of which will be described illustratively herein as the presently preferred embodiments of the invention; however, it will be recognized that various modifications and changes therein with respect to details may be made without departing from the essential features involved.

The present application is a continuation-in-part of Serial No. 754,017, filed August 8, 1958, now abandoned.

Among the forms and uses of the fasteners of this invention are included grommets, rivets, spacers rivets, plug seals, electrical terminal posts, mounting studs, rotative bearing elements, journals, liner sleeves, stand buttons or pads for electrical and other equipment, and various others.

Fasteners of this invention comprise materials primarily in the class of thermoplastics, such as nylon, polyethelene, polyvinylchloride, Teflon, polycarbonates, acetal resins, etc. Nylon is presently the preferred material for most applications. However, there are even now and may even more in the future be a limited number of materials in the category of thermosetting materials exhibiting a sufficient degree of ductility and elasticity to function according to the requirements of the invention in certain of its applications. Likewise there may also be certain elastomeric materials which, while possessing the requisite ductility and elasticity for the forming operation, also possess sufficient hardness and stiffness for the related requirements of such a fastener suiting the particular application. New materials are being developed and discovered from time to time which may also be suitable. Because of these considerations the term "themoplastic like" materials is employed herein as a generic term intended to define the nature of those synthetic or natural materials in the class of non-metals which satisfy the requirements of fasteners embodying this invention, as will become evident from the specification which follows. These materials generally do not include unpolymerized plastics which have ductility but inappreciable elasticity, nor do they include brittle but elastic materials having inappreciable ductility. Elasticity and ductility are essential herein, since these novel fasteners are "clinched" or "set" by forcing deformation of a portion thereof progressively until a self-impelled elastic recoil action occurs completing the clinching operation.

A broad object, therefore, is to provide versatile, simplified and inexpensive fasteners comprising thermoplastic like materials, preferably tough plastic materials such as nylon of polyethylene.

Another object is such a fastener which is easily and quickly installed with minimum tooling requirements.

Yet another object is a strong and durable self-retaining, non-metal fastener.

Another object is to provide improved fasteners which can be installed with little or no skill and with uniformly consistent results, whereas with metal rivets, grommets, etc., relying upon ductility and malleability only, care and skill are required in order to avoid overforming or underforming the headable or otherwise clinchable elements. For example in the case of aluminum grommets used in airplane flexible fuel cells or bladders, supported within interior surfaces of the aircraft by lacing strands or cords which are attached to the fuel cells at intervals through holes in the aircraft structural elements, aluminum grommets have been found to be subject to certain drawbacks and difficulties. Whereas these grommets have been employed in the holes in the aircraft structure in order to lessen chafing and wear of the lacings, it has been difficult to secure aluminum grommets firmly and tightly in place. They may be incompletely swaged, have an insufficient grip range, and are subject to roughening by the installing tools unless great care is used. The present invention provides improved grommets which overcome these difficulties and which are more easily installed with uniformly consistent results than heretofore. Moreover such grommets, manufactured of thermoplastic-like materials provide a good wearing surface for lacings, are light in weight, are compatible with aluminum and aluminum alloy structures in which they may be installed, remain tight and snug once installed despite vibration or wear factors, and possess other requisite and desirable characteristics for such purposes.

In accordance with this invention there is provided a fastener of thermoplastic-like material, including a clinchable portion adapted to be deformed by externally applied force which moves the deformable portion progressively through a range toward a clinched condition, and when during such movement a certain point is reached the clinchable portion inherently moves the remaining distance to the clinched condition by self-impelled elastic action. By producing a line or zone of weakening at a predetermined location in the fastener the shape of the fastener in its clinched condition is predetermined, so that uniformly consistent results are readily achievable with a minimum of effort and skill with these improved fasteners. In the preferred embodiments the fastener comprises a tubular portion which is open at one end and has a peripherally extending groove or line of weakening about which the tubular portion is expanded or bent outwardly through use of suitable clinching tools, until such tubular portion flips back upon itself by self-impelled elastic action into a reversely folded condition representing the clinched condition of the fastener.

These and other features, objects and advantages of the invention will become more fully evident from the following description thereof by reference to the accompanying drawings.

FIGURE 4 is a longitudinal sectional view of a rivet embodying the invention.

FIGURE 5 is a side view taken partly in longitudinal section showing another embodiment in which a stud or post is supported by the fastener.

FIGURE 6 shows still another embodiment in longitudinal section, the embodiment in this case comprising a spacer rivet having both ends deformable to clinch the same in place.

FIGURE 7 is a longitudinal sectional view of still another modification in the nature of a sleeve, grommet or journal member, wherein both ends are deformable for clinching purposes.

FIGURE 8 is a longitudinal sectional view of a rivet similar to that shown in FIGURE 4 but with a modified end formation permitting use of somewhat simpler clinching tools.

Figure 1:
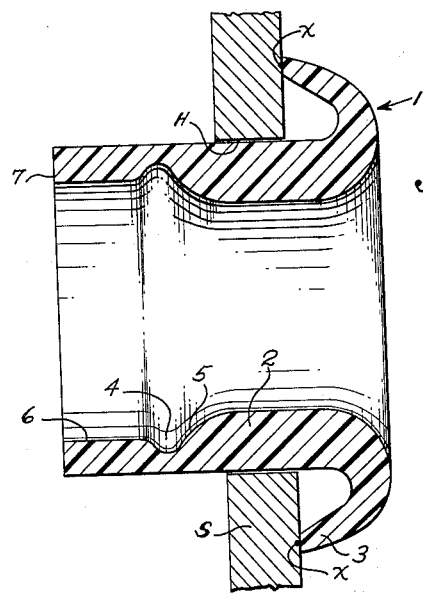
FIGURE 1 is a longitudinal view through a grommet embodying the invention, the grommet being shown in the initial stage of its installation.

Fuel cell bladders of the type indicated above may be installed for example within the interior spaces of a wing intermediate the ribs or transverse stiffeners, and intermediate the skin. A structural element S is shown (FIGURE 1) and may represent any such type of structural element, for instance a stiffener. Such structural element is provided with a hole H of a size within which the grommet will fit closely, a number of such holes being provided at suitable intervals. The size of the hole is not material; in a representative installation the hole H in the aluminum alloy stiffener is in the neighborhood of .340 inch in diameter, and the stiffener has a thickness of .072 inch.

The grommet is preferably formed in one piece of molded nylon and is indicated in general by the numeral 1. It comprises a body portion of tubular form 2, of a length to extend through the thickness of the stiffener S, and carrying at one end a rolled or turned back head 3 which is inclined at an acute angle to the adjacent side of the body portion 2, the projecting, radially outer end of the head 3 being intended to contact one surface of the stiffener S in a circle spaced outwardly about the hole H.

The bore of the tubular portion of the grommet is of an inside diameter which will loosely receive the lacing (not shown). By way of example, in a typical grommet the bore has a minimum diameter of .220 inch.

Preferably, however, the bore is not of the same diameter throughout its entire length. Beyond the face of the stiffener S opposite that contacted by the head 3, the bore is notched annularly as indicated at 4 to define a line of weakening extending peripherally around the tubular portion. The interior of the bore at 5 is curved smoothly into this notch 4. Outwardly (endwise) beyond the notch, the bore interior is preferably of larger diameter than the portion on the opposite side of the notch. Exteriorly the tubular portion of the grommet is preferably of a constant diameter fitting snugly within the hole H yet readily insertable therein.

Figure 2:
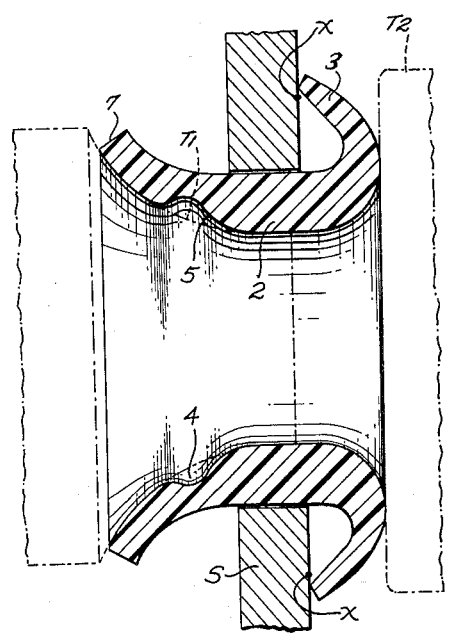
FIGURE 2 is a similar view of the same grommet showing a subsequent stage in its installation.

Following insertion of the grommet into the support S as shown in FIGURE 1, the grommet is clinched by tools T1 and T2, the tool T2 comprising an anvil or holder which bears against the end of the head portion 3 to hold it securely against the support S. The tool T1 comprises a tapered expansion tool which progressively enters the open end 7 of the tubular portion and causes such open end to expand progressively as shown in FIGURE 2 accompanying insertion of the tool. During this expansion of the thermoplastic-like material primary bending thereof takes place along the line of weakening defined by the annular groove 4. The action is forced by the two tools T1 and T2 until finally a point is reached at which the expanded end 7 approaches or reaches the transverse plane defined by the groove 4, whereupon completion of the clinching or heading operation takes place automatically by the self-impelling elastic action of the material causing the end 7 to flip over into the reversely folded condition as depicted in FIGURE 3, wherein the reference numeral 7a designates the completed head or collar 3.

Figure 3:
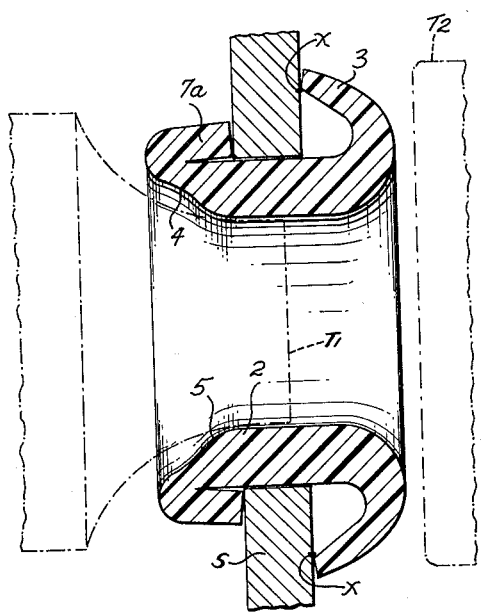
FIGURE 3 is a similar view showing the completed installation in which the tubular portion of the grommet has flipped back reversely upon itself in order to complete the clinching operation.

With the type of preformed head 3 shown in FIGURES 1–3, during the installing operation the head 3 will be squashed or flattened out somewhat against the surface of support S. This may be cited by comparing FIGURE 1 with FIGURE 2. When the deformed tubular portion flips into the reversely folded or clinched condition its free edge may then be drawn firmly against the opposite surface of the support S by recoil action of the preformed head 3 when the forming tool T2 is withdrawn, as drawn in FIGURE 3, insuring a snug and permanently tight grip of the grommet against both faces of the support S.

In the modification shown in FIGURE 4, wherein the fastener is in the form of a rivet adapted to secure the two sheets S1 and S2 together, the preformed head 10 carried by one end of the tubular portion 12 is of a rigid nature. That is, the head is not caused nor required to yield axially under pressure of the installing tool, as is in this case a slight clearance or gap G left between the adjacent supporting sheet and the turned-back end of the tubular portion 12 in its clinched condition as shown.

In the embodiment shown in FIGURE 5 the fastener comprises the tubular portion 14 and the resiliently yieldable preformed head portion 16 which in this case carries an axially projecting post or stud 18. This may serve as a support for electrical terminals (not shown) or may comprise a mounting stud as illustrated, wherein the post 18 passes through a mounting hole in the sheet S2, and is held against the head 16 by a washer 20 (conventional or otherwise) having deflectable tabs 20a which permit the washer to be pressed tightly over the stud and which bite into the stud material to prevent the washer from sliding off once it is pressed into position. In this case the preformed head 16 is axially compressible as previously described, and by reaction against the adjacent surface of the primary support sheet S1 causes the clinched end of the tubular portion 14 to bear tightly against the opposite face of the support S1 in order to form a plug seal preventing fluid leakage through the hole H in which the fastener is mounted.

In the embodiment shown in FIGURE 6, comprising a spacer rivet, the solid rivet body 22 terminates at both ends in tubular portions 24 which are formed identically to permit clinching of the rivet in order to hold the supporting sheets S1 and S2 in predetermined space relationship bearing respectively against shoulder surfaces formed at opposite ends of the intermediate solid body portion 22. In the embodiment shown in FIGURE 7 the fastener comprises an elongated tubular body 26 having deformable opposite end portions 28 and 30 which are clinched in the manner previously described. Such a fastener may serve as a grommet, as a liner sleeve or journal element, or as a rotative bearing in the support S.

In the example shown in FIGURE 8, which is generally similar to that shown in FIGURE 4, the preformed head 32 on the tubular body portion 34 is of the rigid type, although it may be of the resiliently yieldable type if desired. The distinguishing characteristic of this embodiment is the provision of an internal chamfer 36 on the projecting end of the tubular portion 34 which permits use of a flat forming tool T1' cooperating with the opposing tool T2'. When the tools are forced toward each other against the rivet, the chamfer 36 causes flaring of the open end of the tubular portion 34, just as the tapered tool T1 causes flaring in the example depicted in FIGURE 2. Such flaring is continued until the tubular portion flips back upon itself to complete the clinching or forming action as before. This simplifies the tooling requirements even further.

These and other aspects of the invention will be evident from the foregoing disclosure of the preferred embodiment thereof within the framework of the novel subject matter as defined in the appended claims.

I claim as my invention:

1. A grommet of nylon or the like for guiding engagement with a lacing cord or the like passed through a hole in a structural element, said grommet comprising a central tubular portion of an external diameter to enter and to fit closely within such hole and having a substantially constant-diameter bore, and of a length to extend past the opposite surfaces of a structural element of given thickness, when entered within its hole, a preformed turned-back rounded annular head integral with and located outwardly of one end of said central tubular portion, the edge whereof is intended to bear against one surface of the structural element surrounding the hole, and an integral terminus of like external diameter integral with the opposite end of the said central tubular portion, said grommet's bore being annularly notched intermediate the central tubular portion and the terminus to constitute a circle of weakness about which the latter terminus can be rolled out and back to contact the surface of structural element opposite that surface whereon its preformed annular head will bear, said annular notch being located to lie outwardly of the structural element's surface that is opposite the surface engaged by the annular head, the bore of said tubular central portion being initially gradually rounded outwardly, from its constant-diameter bore into the bottom of its notch.

2. A grommet as and for the purpose set forth in claim 1, wherein the bore of the terminus is initially of larger diameter than the bore of the central portion, and beyond the notch.

3. A fastener comprising elastic thermoplastic-like material adapted for mounting in a structural support having a fastener-receiving hole therein, said fastener having a body insertable through said hole and comprising a tubular portion, with stop means on one end thereof disposable adjacent to one side of said support with such tubular portion projecting beyond the opposite side of said support, said tubular portion having a wall which is weakened by a reduction of thickness in an annularly extending zone longitudinally located inwardly from the projecting outer end of such tubular portion and outwardly from said opposite side of the support, the outer end of said projecting tubular portion being expandable progressively by externally applied force until such outer end flips over by self-propelled elastic action of the material in a reverse fold of the tubular portion back upon itself about said zone of weakening, whereby elastic tension in such outer end thereafter maintains said reverse fold as a stop on the projecting end of the fastener.

4. The fastener defined in claim 3, wherein the stop means on the first-mentioned end of the fastener comprises a longitudinally rigid head.

5. The fastener defined in claim 3, wherein the stop means on the first-mentioned end of the fastener comprises a longitudinally resiliently yieldable member extending radially outwardly and at an acute angle in relation to the adjacent side of the fastener body.

6. The fastener defined in claim 3, wherein the stop means on the first-mentioned end of the fastener comprises a longitudinally resiliently yieldable annular member extending radially outwardly and at an acute angle in relation to the adjacent side of the fastener body.

7. A fastener comprising elastic thermoplastic-like material adapted for mounting in a structural support having a fastener-receiving hole therein, said fastener having a body insertable through said hole and comprising a tubular portion, with stop means on one end thereof disposable adjacent to one side of said support with such tubular portion projecting beyond the opposite side of said support, said tubular portion having a wall which is weakened by an annularly extending notch in its inside surface located intermediate the ends of such tubular portion and outwardly from said opposite side of the support, the outer end of said projecting tubular portion being expandable progressively by externally applied force until such outer end flips over by self-propelled elastic action of the material in a reverse fold of the tubular portion back upon itself about said notch, whereby elastic tension in such outer end thereafter maintains said reverse fold as a stop on the projecting end of the fastener.

8. The fastener element defined in claim 7, wherein the tubular portion wall outwardly beyond the notch is thinner than the tubular portion wall inwardly from the notch.

9. The fastener element defined in claim 8, wherein the projecting tip of the tubular portion has an inside chamfer extending around its periphery, by which said expansion is caused to occur under pressure applied thereto endwise of the fastener by a flat tool surface.

10. A fastener comprising elastic thermoplastic-like material adapted for mounting in a structural support having a fastener-receiving hole therein, said fastener having a body insertable through said hole and comprising a tubular portion, on both ends thereof, such tubular portions being adapted to project beyond opposite sides of said support, each such tubular portion having a wall which is weakened by a reduction of thickness in an annularly extending zone longitudinally located inwardly from the projecting outer end of such tubular portion and outwardly from the adjacent side of the support, the outer end of said projecting tubular portion being expandable progressively by externally applied force until such outer end flips over by self-propelled elastic action of the material in a reverse fold of the tubular portion back upon itself about said zone of weakening, whereby elastic tension in such outer end thereafter maintains said reverse fold as a stop on the projecting end of the fastener.

11. A fastener comprising elastic thermoplastic-like material, said fastener having a body joined to a tubular portion, said tubular portion having a wall which is weakened by a reduction of thickness in an annularly extending zone longitudinally located inwardly from the projecting outer end of such tubular portion, the outer end of said projecting tubular portion being expandable progressively by externally applied force until such outer end flips over by self-propelled elastic action of the material in a reverse fold of the tubular portion back upon itself about said zone of weakening, whereby elastic tension in such outer end thereafter maintains said reverse fold as a stop on the projecting end of the fastener.

12. The fastener defined in claim 11, wherein the body thereof is of tubular form throughout its length.

13. The fastener defined in claim 11, wherein the body thereof terminates in an enlarged head at the end opposite the tubular portion, said head serving as an end closure for the interior of the tubular portion.

14. The fastener defined in claim 13, wherein the head comprises a longitudinally resiliently yieldable annular skirt of said material extending radially outwardly and at an acute angle in relation to the adjacent side of the fastener body.

15. The fastener defined in claim 11 wherein the body portion and tubular portion are of integral one-piece construction and the tubular portion is circumferentially grooved to form the reduction of thickness in the annularly extending zone.

References Cited in the file of this patent

UNITED STATES PATENTS

| 1,838,749 | Dester | Dec. 29, 1931 |
| 1,976,776 | Gookin | Oct. 16, 1934 |
| 2,030,167 | Miller | Feb. 11, 1936 |
| 2,507,638 | Leahy | May 16, 1950 |
| 2,664,458 | Rapata | Dec. 29, 1953 |
| 2,800,526 | Moorhead | July 23, 1957 |
| 2,940,558 | Schlueter | June 14, 1960 |
| 2,956,468 | Macy | Oct. 18, 1960 |

FOREIGN PATENTS

| 1,066,475 | France | Jan. 20, 1954 |